(12) United States Patent
Nicolas

(10) Patent No.: US 8,144,775 B2
(45) Date of Patent: Mar. 27, 2012

(54) METHOD AND DEVICE FOR GENERATING CANDIDATE MOTION VECTORS FROM SELECTED SPATIAL AND TEMPORAL MOTION VECTORS

(75) Inventor: Marina Nicolas, Le Fontanil Cornillon (FR)

(73) Assignee: STMicroelectronics S.A., Montrouge (FR)

( * ) Notice: Subject to any disclaimer, the term of this patent is extended or adjusted under 35 U.S.C. 154(b) by 1218 days.

(21) Appl. No.: 11/093,725

(22) Filed: Mar. 30, 2005

(65) Prior Publication Data
US 2005/0232358 A1 Oct. 20, 2005

(30) Foreign Application Priority Data
Mar. 30, 2004 (FR) ..................................... 04 03307

(51) Int. Cl.
*H04N 7/12* (2006.01)
(52) U.S. Cl. .................................................. 375/240.16
(58) Field of Classification Search ............. 375/240.16
See application file for complete search history.

(56) References Cited

U.S. PATENT DOCUMENTS
5,742,710 A * 4/1998 Hsu et al. ...................... 382/236
6,275,532 B1 * 8/2001 Hibi et al. ................. 375/240.17

* cited by examiner

*Primary Examiner* — Young Lee
*Assistant Examiner* — Richard Torrente
(74) *Attorney, Agent, or Firm* — Lisa K. Jorgenson; Stephen Bongini; Fleit Gibbons Gutman Bongini & Bianco P.L.

(57) ABSTRACT

A motion estimation method and device are provided for processing images to be inserted, between a preceding original image and a following original image, into a sequence of determined images. Each image is divided into pixel blocks and a motion vector is associated with each block of a processed image. Motion vectors associated with respective blocks of the image are processed and motion vectors associated with respective blocks of a preceding processed image (spatial and temporal motion vectors) are selected with respect to a current block of an image being processed. Candidate motion vectors are generated from the motion vectors selected. One vector is elected from among the candidate vectors. Information associating the elected vector with the block is stored. A temporal motion vector is selected only if it satisfies a determined selection criterion based on the orientation of the motion vector.

22 Claims, 4 Drawing Sheets

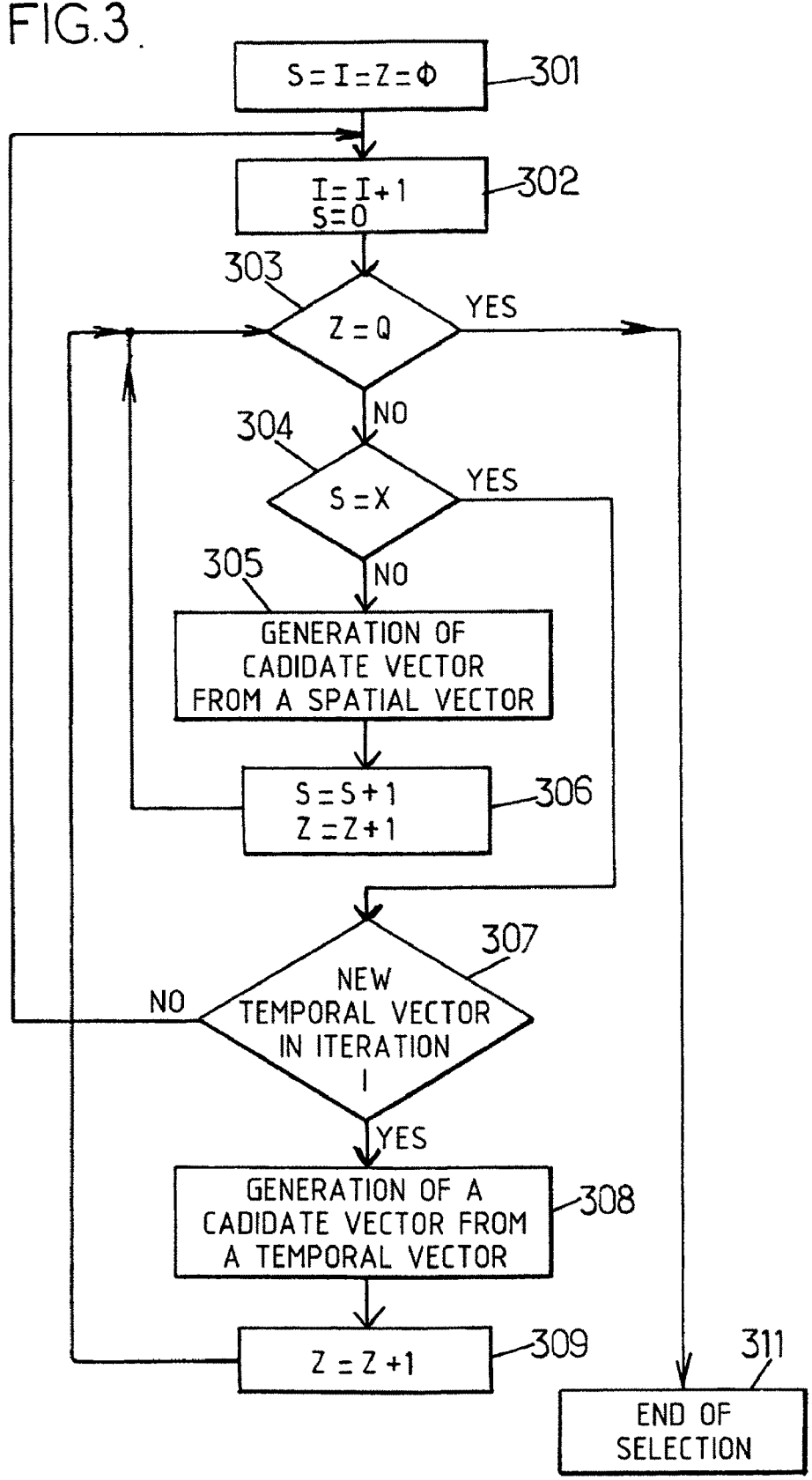

METHOD AND DEVICE FOR GENERATING CANDIDATE MOTION VECTORS FROM SELECTED SPATIAL AND TEMPORAL MOTION VECTORS

CROSS-REFERENCE TO RELATED APPLICATIONS

This application is based upon and claims priority from prior French Patent Application No. 04 03307, filed Mar. 30, 2004, the entire disclosure of which is herein incorporated by reference.

FIELD OF THE INVENTION

The present invention relates to the field of sequential image display, and more precisely to image processing methods for encoding images or inserting images within a sequence of images of the video or film type.

BACKGROUND OF THE INVENTION

In certain video or film image processing systems, the image rate (number of images per second) is insufficient for high-quality display. Consequently, additional images are generated via an interpolation function and displayed between original images in order to increase the image rate and improve the quality of the display. An interpolation function of this type conventionally calculates the value of the pixels of an interpolated image, in particular as a function of the value of the pixels of the preceding original image and/or the value of the pixels of the following original image.

Such an interpolation function is based on the correlation that exists between successive images of a video or film. This is because, in a sequence of video images, subjects that are moving generally appear in different respective regions of several consecutive images. Interpolated images are therefore generated from parts of preceding and/or following original images.

Conventionally, an image is divided into pixel blocks and the assumption is made that each block is substantially identical from one image to another even if there is motion of this block between two images. Consequently, an image is interpolated from original images by seeking, for each current block of the image being interpolated, that one of the blocks of a preceding original image and/or a following original image that is the most probable.

Motion estimation and/or compensation methods offer block searching methods thus adapted for generating interpolated images. A correlation between those parts of the consecutive images in which a moving object appears may in fact be expressed via a motion vector. The motion vector represents the motion of a pixel block from one image to the other. It has a vertical component and a horizontal component, representing the displacement that has to be applied to a block of a preceding image in order to arrive at the position of a substantially identical pixel block in a following image.

Such methods are conventionally used in video data compression systems, such as systems based on the MPEG standard. Such systems are used to reduce the quantity of image data to be transmitted or stored, by compressing this data so as to allow it to be rapidly transferred to digital networks or even telephone lines, or to allow it to be recorded on digital media. Consequently, only certain reference images are encoded and transmitted, and then, on the receive side, the missing intermediate images are interpolated according to the motion vectors transmitted with the encoded images.

In such systems, on the transmit side, the intermediate image is processed so as to transmit the least possible amount of information, as mentioned above. Thus, the intermediate image is divided into blocks. For each block, a correlation is calculated between the current block and a selection of candidate blocks of a preceding and/or following original or already processed image. This correlation calculation delivers an error relating to each candidate block. A candidate block is elected, in order to represent the current block of the intermediate image. The elected candidate block is that one having the highest correlation with the current block, or else the smallest error. To allow interpolation of the intermediate images on the receive side, the processed image is transmitted via the following information, which is generally transmitted relative to a current block of an image to be interpolated:

an indication of the candidate block elected;
a motion vector representing a displacement of the elected candidate block to the position of the current block; and
an error delivered by the correlation calculation.

Thus, on the receive side, the missing processed images are interpolated on the basis of the information received with the encoded images and a value of pixels of each block of these images is thus determined.

Certain interlaced image display systems also use motion estimation and/or compensation methods.

Image rate conversion devices also employ such methods. Such devices make it possible in fact to increase an original image rate by generating additional images obtained by interpolation of the original images. These devices are conventionally used to adapt the image rates between, on the one hand, an image generation, encoding, transmission and/or storage system and, on the other hand, an image display system, which involve different image rates.

In this case, the image to be interpolated is divided into blocks. For each of the blocks, candidate vectors are generally generated. For each of the candidate vectors, a block in the preceding original image and a block in the following original image corresponding to a displacement of the position of the current block relative to the candidate vector are selected, and then the correlation between the selected block of the preceding image and the selected block of the following image is calculated. The candidate vector elected is the vector for which the calculated correlation is the largest. The current block is then interpolated from the block in the preceding original image and from the block in the following original image that are associated with the candidate vector elected. In this way, images are generated by interpolation.

The term "processed image" refers to images divided into a plurality of blocks for which a motion vector has been elected. Thus, interpolated images are generated by interpolation of the processed images.

The next section presents basic concepts conventionally used in motion estimation methods. It is common practice to distinguish several types of images: original images of type I (intra images) which are encoded without reference to other images; images of type P (predictive images) which are interpolated via a motion estimation algorithm on the basis of a preceding original image; and images of type B (bidirectional images) which are interpolated via a motion estimation algorithm based on a preceding original image and on a following original image.

As described above, a motion estimation is based on the assumption that a pixel block of the image being processed can be modeled as displacement of a block of the preceding and/or following original image. Consequently, each current block of the image being processed is normally generated from a block of the preceding and/or following original image. It is therefore supposed that each pixel of any one block undergoes substantially the same displacement. The motion vectors represent this displacement information. Consequently, a motion vector is associated with each of the blocks of a processed image and consequently, by applying, to the blocks of the preceding original image and/or to the blocks of the following original image, a displacement corresponding to the respective associated motion vectors, an interpolated image is obtained.

One difficulty with such methods is how to search, in each of the blocks of a current image to be interpolated, for the block(s) of the preceding and/or following image that is (are) best suited among a set of candidate blocks. For this purpose, motion estimation methods are conventionally based on block matching techniques in which a motion vector is obtained by reduction of a cost function that measures the difference between the matched blocks.

For each given block of the image being processed, a motion search technique is carried out in order to determine where this block is in the preceding original image and/or the following original image. The most appropriate of the blocks of the preceding and/or following image is then elected. This is based on the assumption that each block is substantially identical from one image to another, as was mentioned above.

Thus, there is known a technique based on a full search algorithm in which a set of blocks is selected from the preceding original image and/or from the following original image that lie within a window of determined dimensions centered on the block, this being called the search window. A correlation is calculated for each of the blocks of the search window for the preceding and/or following original image. The block giving the best correlation (or else the smallest error) is selected.

FIG. 1 illustrates such a search applied to a search window whose dimensions are 8 blocks by 4 blocks.

A major drawback of this technique is the number of calculations to be performed, this being larger the larger the size of the search window.

Other search techniques provide a motion estimation according to information associated with the blocks of a preceding processed image and/or with the blocks of the image being processed, so as to estimate the motion of each of the current blocks of the image being processed. In this type of method, a motion vector is associated with each of the blocks of the processed images and these motion vectors are stored in order to be used when processing the following image to be processed.

For this purpose, two types of motion vectors are conventionally defined:
  spatial motion vectors representing a spatial correlation (that is to say representing the motion of adjacent blocks in the image being processed); and
  temporal motion vectors representing a temporal correlation (that is to say representing the motion of any blocks in the preceding processed image).

Methods offering a reduction in the quantity of calculations relating to the search for suitable blocks for the processing of an image by selecting candidate motion vectors from within a search window are known. The correlation calculation is performed only for these selected candidate vectors. Thus, by limiting the number of candidate motion vectors, the number of correlation calculations needed is reduced. Consequently, the election of a motion vector for a current block of an image being processed is less costly.

Certain methods offer a selection of candidate motion vectors based on a criterion associated with the relative position of blocks of the preceding processed image relative to the position of the current block in the image being processed. Thus, candidate motion vectors are selected only if they are associated with blocks deemed to be relevant owing to their position.

Moreover, the motion of a block is considered to be substantially equivalent to the motion of a neighboring block. In general, therefore, spatial candidate motion vectors, that is to say motion vectors that have already been associated with neighboring pixel blocks in the image being processed, are also selected.

With this type of method there is a risk of selecting a set of candidate vectors that are not relevant to a given current block and consequently of electing a motion vector from a set of candidate motion vectors that may not be relevant to a current block. This is because the selection of the candidate motion vectors is carried out according to a fixed rule associated with the position of the blocks relative to the current block. It is therefore carried out independently of the actual relevance of the blocks with respect to the current block.

FIGS. 2a and 2b illustrate a selection of candidate motion vectors of this type. The candidate motion vectors are selected from within a search window around a current block 201 of an image 200 being processed (FIG. 2a). The corresponding search window in the preceding processed image bears the reference 206 (FIG. 2b). Candidate blocks of the current block 201 are selected on the basis of their relative position with respect to the current block. Thus, the blocks 202, 203, 204 and 205 of the current processed image and the blocks 207, 208, 209, 210 and 211 of the preceding processed image are selected. The selected candidate motion vectors of the current block 201 are consequently the motion vectors V1, V2, V3, V4, V5, V6, V7, V8 and V9 associated with the blocks 202, 203, 204, 205, 207, 208, 209, 210 and 211, respectively.

The selection of candidate vectors obeys a fixed rule. Under such circumstances, the selection results in relatively poor performance, especially when the current pixel block corresponds in the image being processed to the boundary of a moving object.

Specifically, the performance of motion estimation and/or compensation devices is greatly dependent on the quality of the selection of the candidate motion vectors. This is because an effective selection of candidate motion vectors makes it possible to reduce the number of correlation calculations, which is equal to the number of candidate motion vectors selected. Consequently, it is desirable to have a method of selecting candidate vectors that is efficient. From another standpoint, this selection must be accomplished by selection rules that remain simple.

SUMMARY OF THE INVENTION

It is an object of the present invention to meet these requirements by providing a method of generating candidate motion vectors on the basis of motion vectors selected according to a quality criterion relating to the motion vectors. Consequently, the present invention offers a compromise between effective generation, through relatively rapid and easily implemented selection rules, and good image quality.

One embodiment of the present invention provides a motion estimation method for processing images intended to be inserted, between a preceding original image and a following original image, into a sequence of images. Each of the images is divided into a plurality of pixel blocks, and a motion vector is associated with each of the pixel blocks of a processed image. According to the method, for a current block of an image being processed, there is selected spatial motion vectors associated with respective pixel blocks of the image being processed and temporal motion vectors associated with respective pixel blocks of a preceding processed image. Candidate motion vectors are generated from the selected motion vectors, and a motion vector is elected from among the candidate motion vectors. Information associating the elected motion vector with the current pixel block is stored. A temporal motion vector is selected only if it satisfies a determined selection criterion based on the orientation of the motion vector.

Another embodiment of the present invention provides a motion estimation device for processing images intended to be inserted, between a preceding original image and a following original image, into a sequence of images. Each of the images is divided into a plurality of pixel blocks, and a motion vector is associated with each of the pixel blocks of a processed image. The device includes a selection unit, a generation unit, an election unit and a memory. The selection unit selects spatial motion vectors associated with respective pixel blocks of the image being processed and selects temporal motion vectors associated with respective pixel blocks of a preceding processed image. The generation unit generates candidate motion vectors from the selected motion vectors, and the election unit elects a motion vector from among the candidate motion vectors. The memory stores an association of the elected motion vector with the current pixel block. A temporal motion vector is selected only if a determined selection criterion based on the orientation of the motion vector is satisfied.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

BRIEF DESCRIPTION OF THE DRAWINGS

FIG. 3 illustrates a flowchart for the generation of candidate motion vectors of the image being processed according to one embodiment of the present invention;

DETAILED DESCRIPTION OF PREFERRED EMBODIMENTS

Figure 1:
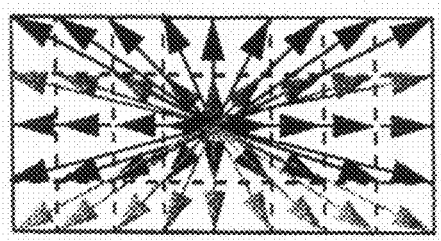
FIG. 1 illustrates a motion vector selection technique based on a full search algorithm.
Figure 2A:
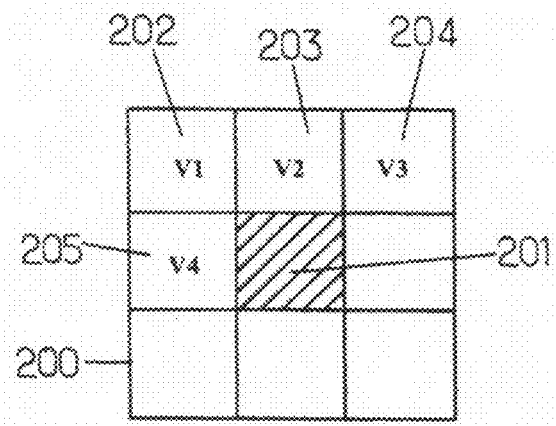
FIGS. 2a and 2b illustrate a technique of selecting candidate motion vectors from the position of the corresponding pixel blocks relative to the current block.
Figure 2B:
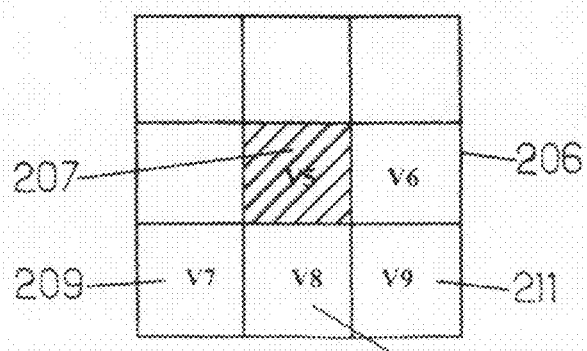

Preferred embodiments of the present invention will be described in detail hereinbelow with reference to the attached drawings.

Preferred embodiments of the present invention provide a motion estimation method for processing images that are each intended to be inserted between a preceding original image and a following original image in a sequence of determined images. Each image is divided into a plurality of pixel blocks, and a motion vector is associated with each of the pixel blocks of a processed image. According to the method, for a current block of an image being processed, the following steps are performed. There are selected special motion vectors associated with respective pixel blocks of the image being processed and temporal motion vectors associated with respective pixel blocks of a preceding processed image. Candidate motion vectors are generated from the selected motion vectors, and a motion vector is elected from among the candidate motion vectors. An association of the elected motion vector with the current pixel block is stored. A temporal motion vector is selected only if it satisfies a determined selection criterion based on the orientation of the motion vector.

In one embodiment, the processed image is interpolated by determining the values of the pixels of the current block according to the values of the pixels in the preceding original image that are indicated by the elected motion vector from the positions of the pixels of the current pixel block to be interpolated and/or according to the values of the pixels in the following original image that are indicated by the elected motion vector from the positions of the pixels of the current pixel block to be interpolated.

Preferably, the pixel block can be divided into a plurality of pixel sub-blocks. In this case, the step of determining the pixel values comprises, for each sub-block of a current block, the following steps. A corrected motion vector relative to the sub-block is calculated from the elected motion vector of the current block and at least one elected motion vector of a neighboring block or sub-block, and the corrected motion vector is associated with the sub-block. The values of the pixels of the sub-block are determined according to the values of the pixels in the preceding original image that are indicated by the corrected motion vector from the positions of the pixels of the pixel sub-block to be interpolated and/or according to the values of the pixels in the following original image that are indicated by the corrected motion vector from the positions of the pixels of the pixel sub-block to be interpolated.

In some embodiments, the temporal motion vectors are selected from a set that comprises temporal motion vectors corresponding to respective pixel blocks of the preceding processed image, the positions of which are determined and fixed relative to the position of the current pixel block of the image being processed, with the set forming a set of pixel blocks around the current pixel block.

Preferably, the election is made by the following steps. For each of the candidate motion vectors, an error is calculated based on the correlation between the values of the pixels of a first pixel block given in the preceding original image that are indicated by the candidate motion vector from the positions of the pixels of the current pixel block to be processed and/or the values of the pixels of a second pixel block given in the following original image indicated by the candidate motion vector from the positions of the pixels of the current pixel block to be processed. The candidate motion vector for which the error is the smallest is elected.

Further embodiments of the present invention provide a motion estimation device for processing images that are each intended to be inserted between a preceding original image and a following original image in a sequence of determined images. Each image is divided into a plurality of pixel blocks, and a motion vector is associated with each of the pixel blocks of a processed image. The device includes, with respect to a current block of an image being processed, a selection unit for selecting motion vectors associated with respective pixel blocks of the image being processed and for selecting motion vectors associated with respective pixel blocks of a preceding processed image (known as spatial motion vectors and temporal motion vectors, respectively). The device also includes a generation unit, an election unit, and a memory. The generation unit generates candidate motion vectors from the selected motion vectors, and the election unit elects a motion vector from among the candidate motion vectors. The memory stores an association of the elected motion vector with the current pixel block. A temporal motion vector is selected only if a determined selection criterion based on the orientation of the motion vector is satisfied.

Still further embodiments of the present invention provide a computer program product that can be loaded directly into the internal memory of a digital computer. The computer program product includes software code portions for executing the steps of a method according to an embodiment of the present invention when the program is run on the computer.

Exemplary embodiments of the present invention will now be described in detail with reference to the figures.

In embodiments of the present invention, candidate motion vectors are generated, for at least certain of the pixel blocks of the image being processed (hereafter called the current block), from the motion vectors selected among the spatial motion vectors (hereafter called spatial vectors) and among the temporal motion vectors (hereafter called temporal vectors).

The expression "generation of candidate vectors from motion vectors" refers to the fact that the candidate vectors may be different from the selected motion vectors. This is because the selected motion vectors, whether spatial or temporal, may be adapted in order to generate candidate vectors allowing the performance of such image processing methods to be optimized.

Candidate spatial vectors are relevant when they are associated with a pixel block that represents the same object as the current block. A block that corresponds to the border of the object has an associated spatial vector that is consequently less relevant. In order to make the motion estimation converge and to guarantee a certain homogeneity in an image sequence, it is in any case usual to select spatial motion vectors.

Spatial vectors are preferably selected from the position of the pixel blocks of the image being processed relative to the current block. Thus, spatial vectors associated with blocks of the image being processed, which are determined by their position relative to the current block, are selected as candidate motion vectors.

Figure 6:
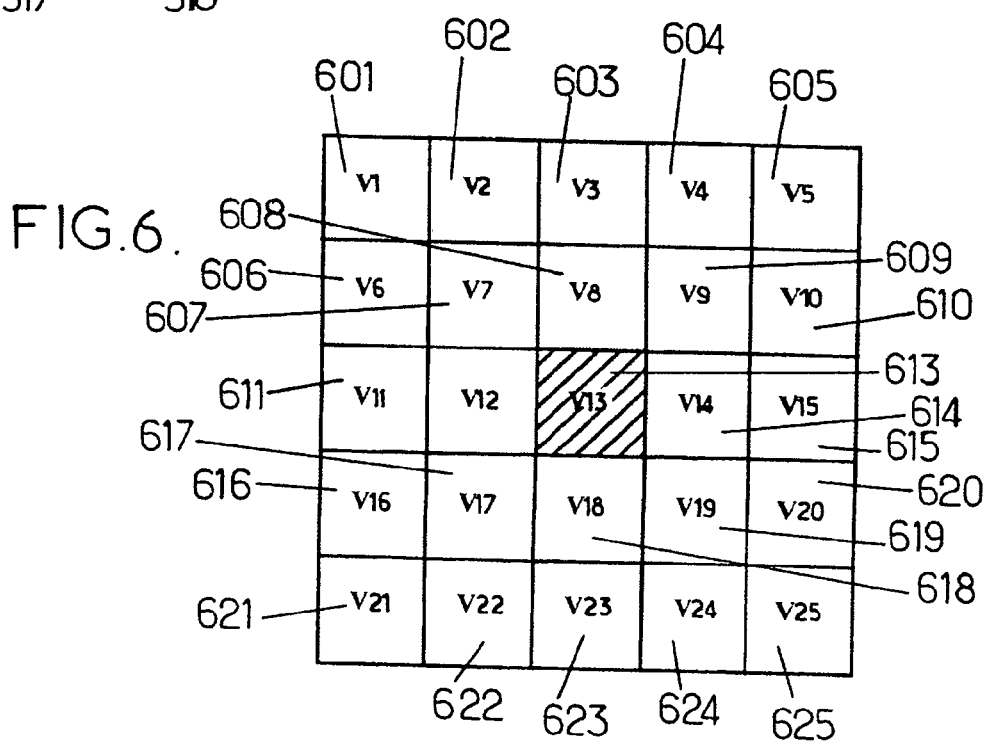
FIG. 6 illustrates a technique of generating candidate motion vectors of the image being processed among the temporal motion vectors according to one embodiment of the present invention.

Moreover, temporal vectors are also selected. Preferably, a set of temporal vectors is determined beforehand according to simple criteria. For example, such a set of temporal motion vectors can be easily determined by defining a search window whose dimensions are N blocks by M blocks, where N and M are integers, which window surrounds the position corresponding to the current block in the preceding processed image. FIG. 6 illustrates such a set of pixel blocks belonging to the preceding processed image. The position corresponding to the current block 613 in the preceding processed image is located at the center of the set of blocks formed by the twenty-five blocks 601-625. Motion vectors V1-V25 are associated with the blocks 601-625, respectively.

Candidate motion vectors are selected from this set of temporal vectors on the basis of a selection criterion relating to their respective orientation.

In a preferred embodiment of the present invention, only the temporal vectors that bring the pixel blocks with which they are respectively associated close to the current block are selected. Thus, only temporal vectors directed towards the current block are selected in order to generate candidate vectors. Such temporal motion vectors are deemed to be relevant within the context of the present invention.

To limit the calculations applied to each of the candidate motion vectors in order to elect the most suitable of the candidate motion vectors, it is advantageous to specify a fixed number of candidate motion vectors, this fixed number being specified so as to satisfy a compromise between good quality of the images obtained by interpolation (on the basis of processed images for encoding and for converting an image rate) and a limited number of calculations.

For this purpose, in one embodiment of the present invention, a specified number Q of candidate motion vectors is generated, where Q is very much less than the total number of pixel blocks of an image (considering pixel blocks of fixed size in order to simplify matters).

FIG. 3 illustrates a flowchart for generating candidate motion vectors for the image being processed according to one embodiment of the present invention. The generation is carried out by generating, in a first step, candidate vectors from spatial motion vectors, then generating, in a second step, candidate vectors from temporal motion vectors, and then, if appropriate, by repeating these two steps. A counter I corresponds to the number of iterations of these two generation steps. A counter Z corresponds to the number of candidate motion vectors already generated. A counter S corresponds to the number of candidate vectors generated from spatial motion vectors during an iteration of the generation steps.

The counters S, I and Z are set to zero (step 301). The counter S is reset to zero and the selection step iteration counter I is incremented by 1 (step 302).

In the first generation step (step 305), a specified number X of candidate vectors is generated from candidate spatial motion vectors (steps 304 and 305) and the counter Z of candidate motion vectors generated is incremented by 1 (step 306).

Next, in the second generation step, as long as this is possible (step 307), relevant temporal motion vectors are selected from a predefined set of temporal motion vectors (step 308), incrementing the respective counter Z of candidate motion vectors generated (step 309). The temporal motion vectors are selected if they meet a relevance criterion associated with their orientation, in order to generate candidate motion vectors (step 307). This second generation step is carried out as long as the total number of candidate motion vectors already generated, that is to say the sum of the number of candidate vectors generated from spatial motion vectors and the number of candidate vectors generated from temporal motion vectors, is less than or equal to the specified number Q (step 306).

If after the second step the total number of candidate motion vectors generated is strictly less than the specified number Q, all or part of the first step is preferably repeated. The counter I is incremented by 1 and the counter S is set to 0 (step 302). Next, candidate motion vectors are generated from spatial vectors (step 305). In a preferred embodiment of the present invention, in the first repeated generation step, of iteration number 1, candidate motion vectors are generated from the candidate motion vectors already generated in the first generation step of the previous iteration, of iteration number I-1.

In another embodiment of the present invention, candidate motion vectors are generated from the spatial vectors already selected from the preceding iteration of this first generation step. The first generation step is interrupted as soon as the number of candidate motion vectors reached is equal to Q (step 303).

If at the end of the first step of the second iteration the defined number Q of candidate motion vectors has still not been reached, in a preferred embodiment of the present invention, candidate motion vectors are generated from the candidate motion vectors already generated from temporal motion vectors. In another embodiment of the present invention, candidate vectors are generated from the temporal motion vectors already selected in the preceding iteration of this first generation step, and so on.

This principle of iteration of the first and second selection steps is applied, as described above, until the number of candidate motion vectors equals Q.

In one embodiment of the present invention, the spatial and temporal motion vectors selected and the candidate vectors already selected are processed in order to generate the candidate vectors. In one embodiment of the present invention, the processing consists in adding a random vector to each selected vector, whether this be a spatial motion vector, a temporal motion vector or a candidate vector already selected in a preceding iteration of the first or second generation step, so as to generate a candidate vector in order to make it possible to ensure diversity of the candidate vectors.

In a preferred embodiment of the present invention, the selection criterion applied to the temporal motion vectors in the case of the example illustrated in FIG. 6 is described below, in which Vix denotes the horizontal component and Viy denotes the vertical component of a motion vector Vi, where $1 \leq i \leq 25$.

V1 is selected if $Min(V1x,V1y) \geq 0$;
V2 is selected if $Min(V2x,V2y) \geq 0$;
V3 is selected if $V3y \geq 0$;
V4 is selected if $Min(-V4x,V4y) \geq 0$;
V5 is selected if $Min(-V5x,V5y) \geq 0$;
V6 is selected if $Min(V6x,V6y) \geq 0$;
V7 is selected if $Min(V7x,V7y) \geq 0$;
V8 is selected if $V8y \geq 0$;
V9 is selected if $Min(V9x,-V9y) \leq 0$;
V10 is selected if $Min(-V10x,V10y) \geq 0$;
V11 is selected if $V11x \geq 0$;
V12 is selected if $V12x \geq 0$;
V13 is selected if $Max(Abs(V13x), Abs(V13y)) \leq Wid(block)$;
V14 is selected if $Vt14x \leq 0$;
V15 is selected if $V15x \leq 0$;
V16 is selected if $Min(V16x,-V16y) \geq 0$;
V17 is selected if $Max(V17x,-V17y) \geq 0$;
V18 is selected if $V18y \leq 0$;
V19 is selected if $Min(V19x,V19y) \leq 0$;
V20 is selected if $Max(V20x,V20y) \leq 0$;
V21 is selected if $Min(V21x,-V21y) \leq 0$;
V22 is selected if $Min(V22x,-V22y) \leq 0$;
V23 is selected if $V23y \leq 0$;
V24 is selected if $Max(V24x,V24y) \leq 0$; and
V25 is selected if $Max(V25x,V25y) \leq 0$,
where:
Min(a,b) represents the smallest value of a or b;
Max(a,b) represents the largest value of a or b;
Abs(a) represents the absolute value of a; and
Wid(block) represents the constant width of a pixel block.

FIGS. 4a to 4f illustrate the selection of a set of motion vectors according to one exemplary embodiment of the present invention.

In FIGS. 4a-4f, the search window 206 in the preceding processed image comprises the blocks 207, 208, 209, 210 and 211 to which the motion vectors V5, V6, V7, V8 and V9 are respectively associated.

Figure 4A:
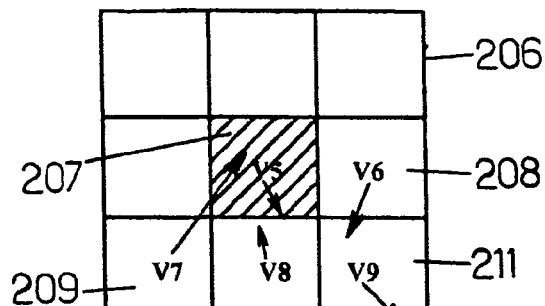
FIGS. 4a to 4f illustrate the generation of candidate motion vectors of the image being processed according to one embodiment of the present invention.
Figure 4B:
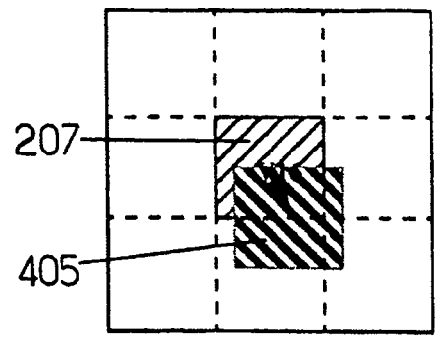

FIG. 4b illustrates the superposition of the block 405 on the current block 207, which represents the result of the vector displacement of the candidate block 207 according to the motion vector V5. Since the two blocks 207 and 405 overlap over a portion substantially equal to half the area of a block, the motion vector V5 selected as candidate motion vector turns out to be rather relevant.

Figure 4C:
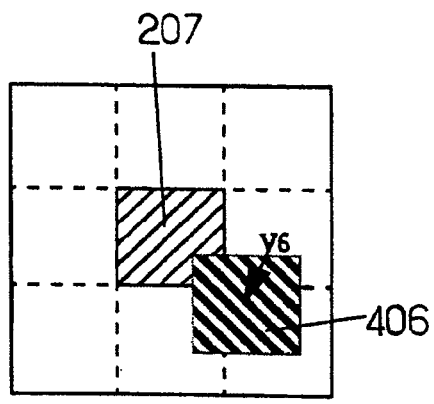

FIG. 4c illustrates the superposition of the block 406 on the current block 207, which represents the result of the vector displacement of the candidate block 208 according to the associated motion vector V6. Since the two blocks 207 and 406 overlap over a portion substantially equal to one ninth of the area of a block, the selected motion vector V6 turns out to be a vector that is relatively relevant to the current block 207.

Figure 4D:
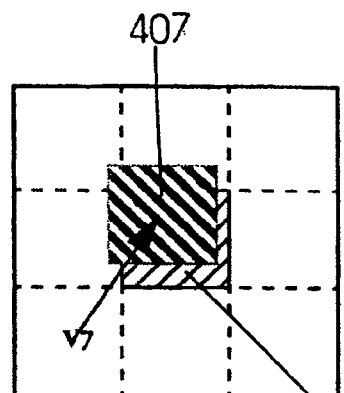

FIG. 4d illustrates the superposition of the block 407 on the current block 207, which represents the result of the vector displacement of the candidate block 209 according to the motion vector V7. Since the two blocks 207 and 407 overlap over a portion substantially equal to nine tenths of the area of a block, the candidate motion vector V7 is highly relevant.

Figure 4E:
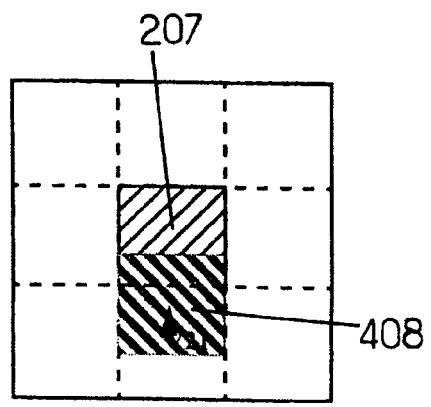

FIG. 4e illustrates the superposition of the block 408 on the current block 207, which represents the result of the vector displacement of the candidate block 210 according to the motion vector V8. Since the two blocks 207 and 408 overlap over a portion substantially equal to one half of the area of a block, the vector V8 proves to be relatively relevant.

Figure 4F:
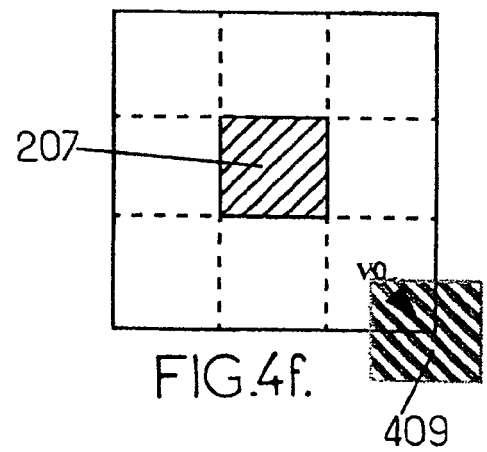

FIG. 4f illustrates the superposition of the block 409 on the current block 207, which represents the result of the vector displacement of the candidate block 211 according to the motion vector V9. Since the blocks 207 and 409 do not overlap at all, the candidate motion vector V9 is not relevant.

Figure 5A:
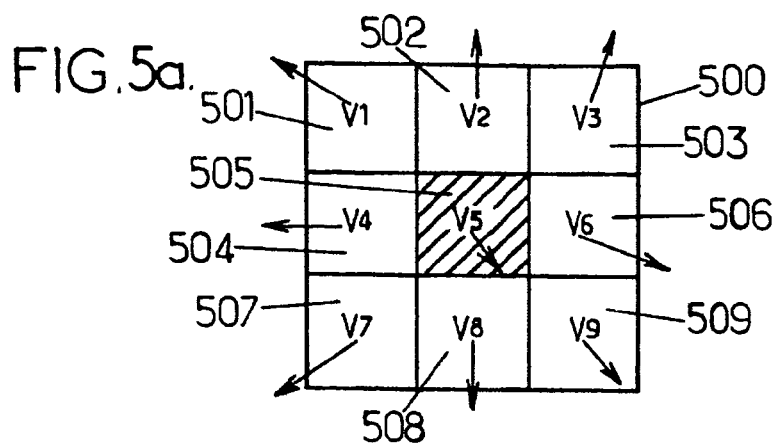
FIG. 5a and FIG. 5b illustrate a technique of generating candidate motion vectors of the image being processed according to one embodiment of the present invention.
Figure 5B:
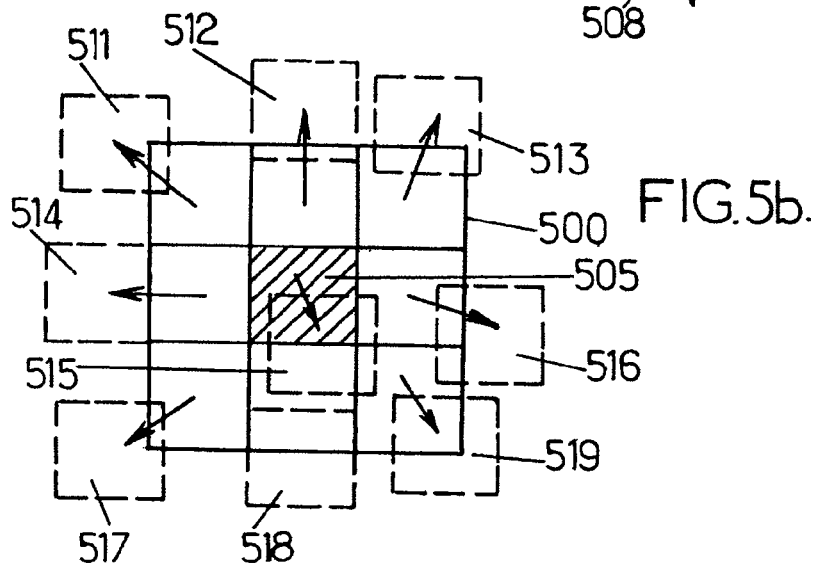

FIGS. 5a and 5b illustrate the implementation of an embodiment of the present invention in an example in which a single temporal motion vector is selected from the search window 500 as candidate temporal motion vector and is therefore relevant. Thus, the set of blocks 500 lies within the preceding processed image, the blocks 501, 502, 503, 504, 505, 506, 507, 508 and 509 being respectively associated with respective motion vectors V1, V2, V3, V4, V5, V6, V7, V8 and V9. FIG. 5b illustrates the blocks 511, 512, 513, 514, 515, 516, 517, 518 and 519, which correspond to the displacement of the temporal candidate blocks according to their respective associated motion vector. Only the motion vector V5 is relevant.

In addition, a motion vector associated with a given block of pixels represents in fact the approximate movement of each pixel of the block from one image to another, since all the pixels of one and the same block do not have exactly the same motion. In one embodiment of the present invention, in order to increase the precision of the interpolated images obtained from the processed images, if the application relates to a conversion of image rates, a pixel block is itself divided into several pixel sub-blocks and a corrected motion vector is calculated for each sub-block. The corrected motion vectors of a sub-block are calculated on the basis of the motion vector of the respective block and from motion vectors of one or more neighboring pixel blocks or sub-blocks.

In practice, the selection method according to preferred embodiments of the present invention gives a satisfactory performance by setting the number Q of candidate motion vectors at 16 or 32, setting the number of spatial motion vectors available, as defined above, to 4 and setting the number of temporal motion vectors available, as defined above, to 9 or 25, for example.

The present invention makes it possible to significantly reduce the complexity of the calculations and allows better image rendition with regard to rapid movements and better performance uniformity within the image sequence. Advantageously, it can be implemented in systems as defined above, improving the rendition of the images.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A computer-implemented motion estimation method for processing images intended to be inserted, between a preceding original image and a following original image, into a sequence of images, each of the images being divided into a plurality of pixel blocks, and a motion vector being associated with each of the pixel blocks of a processed image, the method comprising, for a current block of an image being processed, steps of:
   selecting spatial motion vectors associated with respective pixel blocks of the image being processed and temporal motion vectors associated with respective pixel blocks of a preceding processed image;
   generating, by a processing device, candidate motion vectors from the motion vectors that were selected;
   electing one motion vector from among the candidate motion vectors that were generated; and
   storing information associating the one motion vector that was elected with the current pixel block,
   wherein the selecting step comprises the sub-steps of:
      determining a set of temporal motion vectors; and
      only selecting some temporal motion vectors from the set of temporal motion vectors based on the respective orientations of the temporal motion vectors of the set, and
   a specified number Q of candidate motion vectors is selected by a process comprising the steps of:
      generating a specified number X of candidate vectors from spatial motion vectors, X being less than the number of candidate motion vectors remaining to be selected with respect to the current pixel block;
      generating candidate vectors from temporal motion vectors that satisfy a selection criterion based on the respective orientations of the temporal motion vectors as long as the number of candidate motion vectors already generated is less than or equal to Q;
      if the number of generated candidate motion vectors is less than Q after the steps of generating the specified number X of candidate vectors from spatial motion vectors and generating candidate vectors from temporal motion vectors that satisfy the selection criterion, repeating the step of generating the specified number X of candidate vectors from spatial motion vectors;
      if the number of generated candidate motion vectors is less than Q after repeating the step of generating the specified number X of candidate vectors from spatial motion vectors, repeating the step of generating candidate vectors from temporal motion vectors that satisfy the selection criterion; and
      repeating the previous two repeating steps in succession until the number of generated candidate motion vectors is equal to Q.

2. The method according to claim 1, further comprising the step of:
   interpolating the processed image,
   wherein the interpolating step includes the sub-step of determining the values of the pixels of the current block according to the values of the pixels in the preceding original image that are indicated by the elected motion vector from the positions of the pixels of the current pixel block to be interpolated and/or according to the values of the pixels in the following original image that are indicated by the elected motion vector from the positions of the pixels of the current pixel block to be interpolated.

3. The method according to claim 2,
   wherein the pixel block is divided into a plurality of pixel sub-blocks, and
   the determining sub-step comprises, for each sub-block of a current block:
      calculating a corrected motion vector relative to the sub-block on the basis of the elected motion vector of the current block and at least one elected motion vector of a neighboring block or sub-block;
      associating the corrected motion vector with the sub-block; and
      determining the values of the pixels of the sub-block according to the values of the pixels in the preceding original image that are indicated by the corrected motion vector from the positions of the pixels of the pixel sub-block to be interpolated and/or according to the values of the pixels in the following original image that are indicated by the corrected motion vector from the positions of the pixels of the pixel sub-block to be interpolated.

4. The method according to claim 1, wherein in the determining sub-step, the set comprises temporal motion vectors corresponding to respective pixel blocks of the preceding processed image, the positions of which are determined and fixed relative to the position of the current pixel block of the image being processed, the set forming a set of pixel blocks around the current pixel block.

5. The method according to claim 1, wherein the electing step comprises the sub-steps of:
   for each of the candidate motion vectors, calculating an error based on the correlation between the values of the pixels of a first pixel block given in the preceding original image that are indicated by the candidate motion vector from the positions of the pixels of the current pixel block to be processed and/or the values of the pixels of a second pixel block given in the following original image indicated by the candidate motion vector from the positions of the pixels of the current pixel block to be processed; and
   electing the candidate motion vector for which the error is the smallest.

6. The method according to claim 1, wherein in the determining sub-step, the set of temporal motion vectors is determined by defining a search window surrounding a position corresponding to the current block in the preceding processed image, the search window having dimensions of N blocks by M blocks, where N and M are integers.

7. The method according to claim 1, wherein in the generating step, the candidate motion vectors are generated by adding a random vector to each of the selected motion vectors.

8. The method according to claim 1, wherein in the selecting sub-step, only temporal motion vectors having orientations which bring the pixel blocks with which they are respectively associated close to the current block are selected.

9. The method according to claim 8, wherein in the selecting sub-step, only temporal motion vectors directed towards the current block are selected.

10. A computer-implemented motion estimation method for processing images intended to be inserted, between a preceding original image and a following original image, into a sequence of images, each of the images being divided into a plurality of pixel blocks, and a motion vector being associated with each of the pixel blocks of a processed image, the method comprising, for a current block of an image being processed, steps of:
- selecting spatial motion vectors associated with respective pixel blocks of the image being processed and temporal motion vectors associated with respective pixel blocks of a preceding processed image;
- generating, by a processing device, candidate motion vectors from the motion vectors that were selected;
- electing one motion vector from among the candidate motion vectors that were generated; and
- storing information associating the one motion vector that was elected with the current pixel block,
- wherein the selecting step comprises the sub-steps of:
  - determining a set of temporal motion vectors; and
  - only selecting some temporal motion vectors from the set of temporal motion vectors based on the respective orientations of the temporal motion vectors of the set, and
- a specified number Q of candidate motion vectors is selected by a process comprising the steps of:
  - generating a specified number X of candidate vectors from spatial motion vectors, X being less than the number of candidate motion vectors remaining to be selected with respect to the current pixel block;
  - generating candidate vectors from temporal motion vectors that satisfy a selection criterion based on the respective orientations of the temporal motion vectors as long as the number of candidate motion vectors already generated is less than or equal to Q; and
  - if the number of generated candidate motion vectors is less than Q after the steps of generating the specified number X of candidate vectors from spatial motion vectors and generating candidate vectors from temporal motion vectors that satisfy the selection criterion, generating additional candidate vectors from the candidate vectors that were already generated until the total number of candidate motion vectors generated is equal to Q.

11. A motion estimation device for processing images intended to be inserted, between a preceding original image and a following original image, into a sequence of images, each of the images being divided into a plurality of pixel blocks, and a motion vector being associated with each of the pixel blocks of a processed image, the device comprising, with respect to a current block of an image being processed:
- a selection and generation unit for selecting spatial motion vectors associated with respective pixel blocks of the image being processed and for selecting temporal motion vectors associated with respective pixel blocks of a preceding processed image, the selection and generation unit generating candidate motion vectors from the motion vectors that were selected;
- an election unit for electing one motion vector from among the candidate motion vectors that were generated; and
- a memory for storing an association of the one motion vector that was elected with the current pixel block,
- wherein the selection and generation unit selects the temporal motion vectors by:
  - determining a set of temporal motion vectors; and
  - only selecting some temporal motion vectors from the set of temporal motion vectors, the temporal motion vectors that are selected satisfying a determined relevance criterion based on orientation of the temporal motion vectors, and
- the selection and generation unit selects a specified number Q of candidate motion vectors, the selection and generation unit including:
  - first means for generating a specified number X of candidate vectors from spatial motion vectors, X being less than the number of candidate motion vectors remaining to be selected with respect to the current pixel block;
  - second means for generating candidate vectors from temporal motion vectors that satisfy the relevance criterion as long as the number of candidate motion vectors already generated is less than or equal to Q; and
  - third means for, if the number of generated candidate motion vectors is less than Q after the first and second means generate candidate vectors, generating additional candidate vectors from the candidate vectors that were already generated by the first and second means until the total number of candidate motion vectors generated is equal to Q.

12. The motion estimation device according to claim 11, further comprising a determination unit for determining values of the pixels of the current block according to the values of the pixels in the preceding original image that are indicated by the elected motion vector from the positions of the pixels of the current pixel block to be interpolated and/or according to the values of the pixels in the following original image that are indicated by the elected motion vector from the positions of the pixels of the current pixel block to be interpolated.

13. The motion estimation device according to claim 11, wherein the set of temporal vectors determined by the selection and generation unit includes temporal motion vectors corresponding respectively to pixel blocks of the preceding processed image, the positions of which are determined and fixed relative to the position of the current pixel block of the image being processed, the set forming a set of pixel blocks around the current pixel block.

14. The motion estimation device according to claim 11, wherein the election unit includes:
- means, for each of the candidate motion vectors, for calculating an error based on the correlation between the values of the pixels of a first pixel block given in the preceding original image that are indicated by the candidate motion vector from the positions of the pixels of the current pixel block to be processed and/or the values of the pixels of a second pixel block given in the following original image that are indicated by the candidate motion vector from the positions of the pixels of the current pixel block to be processed; and
- means for electing the candidate motion vector for which the error is the smallest.

15. The motion estimation device according to claim 11, wherein the selection and generation unit selects only temporal motion vectors having orientations that bring the pixel blocks with which they are respectively associated close to the current block.

16. A non-transitory computer program product encoded with a program for processing images intended to be inserted, between a preceding original image and a following original image, into a sequence of images, each of the images being divided into a plurality of pixel blocks, and a motion vector being associated with each of the pixel blocks of a processed image, the program including instructions for performing, for a current block of an image being processed, steps of:
  selecting spatial motion vectors associated with respective pixel blocks of the image being processed and temporal motion vectors associated with respective pixel blocks of a preceding processed image;
  generating candidate motion vectors from the motion vectors that were selected;
  electing one motion vector from among the candidate motion vectors that were generated; and
  storing information associating the one motion vector that was elected with the current pixel block,
  wherein the selecting step comprises the sub-steps of:
    determining a set of temporal motion vectors; and
    only selecting some temporal motion vectors from the set of temporal motion vectors based on the respective orientations of the temporal motion vectors of the set, and
  a specified number Q of candidate motion vectors is selected by a process comprising the steps of:
    generating a specified number X of candidate vectors from spatial motion vectors, X being less than the number of candidate motion vectors remaining to be selected with respect to the current pixel block;
    generating candidate vectors from temporal motion vectors that satisfy a selection criterion based on the respective orientations of the temporal motion vectors as long as the number of candidate motion vectors already generated is less than or equal to Q; and
    if the number of generated candidate motion vectors is less than Q after the steps of generating the specified number X of candidate vectors from spatial motion vectors and generating candidate vectors from temporal motion vectors that satisfy the selection criterion, generating additional candidate vectors from the candidate vectors that were already generated until the total number of candidate motion vectors generated is equal to Q.

17. The computer program product according to claim 16, wherein the program further includes instructions for performing the step of:
  interpolating the processed image,
  wherein the interpolating step includes the sub-step of determining the values of the pixels of the current block according to the values of the pixels in the preceding original image that are indicated by the elected motion vector from the positions of the pixels of the current pixel block to be interpolated and/or according to the values of the pixels in the following original image that are indicated by the elected motion vector from the positions of the pixels of the current pixel block to be interpolated.

18. The computer program product according to claim 16, wherein the electing step comprises the sub-steps of:
  for each of the candidate motion vectors, calculating an error based on the correlation between the values of the pixels of a first pixel block given in the preceding original image that are indicated by the candidate motion vector from the positions of the pixels of the current pixel block to be processed and/or the values of the pixels of a second pixel block given in the following original image indicated by the candidate motion vector from the positions of the pixels of the current pixel block to be processed; and
  electing the candidate motion vector for which the error is the smallest.

19. The computer program product according to claim 16, wherein in the generating step, the candidate motion vectors are generated by adding a random vector to each of the selected motion vectors.

20. The computer program product according to claim 16, wherein in the selecting sub-step, only temporal motion vectors having orientations which bring the pixel blocks with which they are respectively associated close to the current block are selected.

21. A motion estimation device for processing images intended to be inserted, between a preceding original image and a following original image, into a sequence of images, each of the images being divided into a plurality of pixel blocks, and a motion vector being associated with each of the pixel blocks of a processed image, the device comprising, with respect to a current block of an image being processed:
  a selection and generation unit for selecting spatial motion vectors associated with respective pixel blocks of the image being processed and for selecting temporal motion vectors associated with respective pixel blocks of a preceding processed image, the selection and generation unit generating candidate motion vectors from the motion vectors that were selected;
  an election unit for electing one motion vector from among the candidate motion vectors that were generated; and
  a memory for storing an association of the one motion vector that was elected with the current pixel block,
  wherein the selection and generation unit selects the temporal motion vectors by:
    determining a set of temporal motion vectors; and
    only selecting some temporal motion vectors from the set of temporal motion vectors, the temporal motion vectors that are selected satisfying a determined relevance criterion based on orientation of the temporal motion vectors, and
  the selection and generation unit selects a specified number Q of candidate motion vectors, the selection and generation unit including:
    first means for generating a specified number X of candidate vectors from spatial motion vectors, X being less than the number of candidate motion vectors remaining to be selected with respect to the current pixel block;
    second means for generating candidate vectors from temporal motion vectors that satisfy a selection criterion based on the respective orientations of the temporal motion vectors as long as the number of candidate motion vectors already generated is less than or equal to Q;
    wherein if the number of generated candidate motion vectors is less than Q after the first and second means generate candidate vectors, the first means again generates the specified number X of candidate vectors from spatial motion vectors,
    if the number of generated candidate motion vectors is less than Q after the first means again generates the specified number X of candidate vectors from spatial motion vectors, the second means again generates candidate vectors from temporal motion vectors that satisfy the selection criterion, and the first and second means again generate candidate vectors until the number of generated candidate motion vectors is equal to Q.

22. A non-transitory computer program product encoded with a program for processing images intended to be inserted, between a preceding original image and a following original image, into a sequence of images, each of the images being divided into a plurality of pixel blocks, and a motion vector being associated with each of the pixel blocks of a processed image, the program including instructions for performing, for a current block of an image being processed, steps of:
- selecting spatial motion vectors associated with respective pixel blocks of the image being processed and temporal motion vectors associated with respective pixel blocks of a preceding processed image;
- generating candidate motion vectors from the motion vectors that were selected;
- electing one motion vector from among the candidate motion vectors that were generated; and
- storing information associating the one motion vector that was elected with the current pixel block,
- wherein the selecting step comprises the sub-steps of:
  - determining a set of temporal motion vectors; and
  - only selecting some temporal motion vectors from the set of temporal motion vectors based on the respective orientations of the temporal motion vectors of the set, and
- a specified number Q of candidate motion vectors is selected by a process comprising the steps of:
  - generating a specified number X of candidate vectors from spatial motion vectors, X being less than the number of candidate motion vectors remaining to be selected with respect to the current pixel block;
  - generating candidate vectors from temporal motion vectors that satisfy a selection criterion based on the respective orientations of the temporal motion vectors as long as the number of candidate motion vectors already generated is less than or equal to Q;
  - if the number of generated candidate motion vectors is less than Q after the steps of generating the specified number X of candidate vectors from spatial motion vectors and generating candidate vectors from temporal motion vectors that satisfy the selection criterion, repeating the step of generating the specified number X of candidate vectors from spatial motion vectors;
  - if the number of generated candidate motion vectors is less than Q after repeating the step of generating the specified number X of candidate vectors from spatial motion vectors, repeating the step of generating candidate vectors from temporal motion vectors that satisfy the selection criterion; and
  - repeating the previous two repeating steps in succession until the number of generated candidate motion vectors is equal to Q.

* * * * *